(12) United States Patent
Weinstein

(10) Patent No.: US 9,729,430 B2
(45) Date of Patent: Aug. 8, 2017

(54) SYSTEM, DEVICE, AND METHOD OF DENSE-MODE MULTICAST TUNNELING USING INTERLAYER GROUP MEMBERSHIP CONTROL

(71) Applicant: Raytheon BBN Technologies Corp., Cambridge, MA (US)

(72) Inventor: Joseph Jacob Weinstein, Somerville, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 134 days.

(21) Appl. No.: 14/692,015

(22) Filed: Apr. 21, 2015

(65) Prior Publication Data

US 2016/0315848 A1    Oct. 27, 2016

(51) Int. Cl.
*H04L 12/54* (2013.01)
*H04L 12/761* (2013.01)
*H04L 12/46* (2006.01)

(52) U.S. Cl.
CPC .......... *H04L 45/16* (2013.01); *H04L 12/4633* (2013.01)

(58) Field of Classification Search
CPC ....... H04L 45/16; H04L 45/30; H04L 45/302; H04L 45/304; H04L 45/3065; H04L 45/308; H04L 12/4633
See application file for complete search history.

(56) References Cited

U.S. PATENT DOCUMENTS

| 6,154,463 A * | 11/2000 | Aggarwal | H04L 45/48 370/408 |
| 6,707,796 B1 * | 3/2004 | Li | H04L 12/185 370/254 |
| 7,715,329 B1 * | 5/2010 | Breslau | H04L 43/0817 370/255 |

(Continued)

OTHER PUBLICATIONS

Adams, A., et al., "Protocol Independent Multicast—Dense Mode (PIM-DM): Protocol Specification (Revised)", Network Working Group Request for Comments: (rfc 3973), NextHop Technologies, (Jan. 2005), 55 pgs.

(Continued)

*Primary Examiner* — Kevin Mew
(74) *Attorney, Agent, or Firm* — Schwegman Lundberg & Woessner, P.A.

(57) ABSTRACT

A system, device, and method are provided to control dense-mode multicast traffic across a multilayer system containing an upper network and a tunnel across a lower network. An upstream multicast tunneling edge device (MTED) may indicate to downstream MTEDs, via control messages, the presence of a multicast source, group (SG) pair. The MTEDs may serve as routers or as intelligent bridges in the upper network. Each downstream MTED may create a forwarding state for the SG pair, determine tunnels for which the downstream MTED is to serve as an exit device and configure the tunnels to deliver the traffic. Lower network MTEDs of a tunnel may determine whether to transport multicast data for each SG pair such that multicast traffic routed by a corresponding MTED is carried. An MTED may be able to receive, through the tunnel, multicast traffic for one SG pair even after pruning itself for another SG pair.

26 Claims, 8 Drawing Sheets

(56) References Cited

U.S. PATENT DOCUMENTS

| | | | | |
|---|---|---|---|---|
| 8,310,957 | B1* | 11/2012 | Rekhter | H04L 12/4641 370/256 |
| 9,019,981 | B1 | 4/2015 | Weinstein | |
| 9,100,201 | B1* | 8/2015 | Pichumani | H04L 12/185 |
| 9,419,895 | B2* | 8/2016 | Liu | H04L 45/745 |
| 2002/0150094 | A1* | 10/2002 | Cheng | H04L 12/185 370/389 |
| 2004/0174865 | A1* | 9/2004 | O'Neill | H04L 12/185 370/352 |
| 2006/0140213 | A1* | 6/2006 | Hwang | H04L 12/18 370/390 |
| 2006/0159091 | A1* | 7/2006 | Boers | H04L 45/00 370/390 |
| 2006/0274720 | A1* | 12/2006 | Adams | H04L 12/1836 370/351 |
| 2007/0147372 | A1* | 6/2007 | Liu | H04L 12/18 370/390 |
| 2008/0095160 | A1* | 4/2008 | Yadav | H04L 12/1886 370/390 |
| 2014/0016457 | A1* | 1/2014 | Enyedi | H04L 45/16 370/225 |
| 2014/0204939 | A1* | 7/2014 | Kotalwar | H04L 12/185 370/390 |
| 2016/0043876 | A1* | 2/2016 | Kotalwar | H04L 12/18 370/235 |

OTHER PUBLICATIONS

Andersson, L. Ed., "Framework for Layer 2 Virtual Private Networks (L2VPNs)", Network Working Group Request for Comments: (rfc 4664), (Sep. 2006), 40 pgs.

Andersson, L., "Provider Provisioned Virtual Private Network (VPN) Terminology", Network Working Group Request for Comments: (rfc 4026), (Mar. 2005), 18 pgs.

Armitage, G., "Support for Multicast over UNI 3.0/3.1 based ATM Networks.", Network Working Group Request for Comments: (rfc 2022), (Nov. 1996), 73 pgs.

Armitage, G., "VENUS—Very Extensive Non-Unicast Service", Network Working Group Request for Comments: (rfc 2191), (Sep. 1997), 11 pgs.

Bhattacharyya, S. Ed, "An Overview of Source-Specific Multicast (SSM), Request for Comments: 3569", Network Working Group Request for Comments: (rfc 3569), Sprint, (Jul. 2003), 13 pgs.

Hanks, S., et al., "Generic Routing Encapsulation", Network Working Group Request for Comments: (rfc1701), (Oct. 1994), 8 pgs.

Hanks. S., et al., "Generic Routing Encapsulation over IPv4 networks", Network Working Group Request for Comments: (rfc 1702), (Oct. 1994), 4 pgs.

Hollenbeck, S., "Extensible Provisioning Protocol (EPP) Transport over TCP", Network Working Group Request for Comments: (rfc 5734), VeriSign, Inc., (Aug. 2009), 12 pgs.

Kamite, Y, Ed., "Requirements for Multicast Support in Virtual Private LAN Services", Network Working Group Request for Comments: (rfc 5501), NTT Communications, (Mar. 2009), 28 pgs.

Nagarajan, A. Ed., "Generic Requirements for Provider Provisioned Virtual Private Networks (PPVPN)", Network Working Group Request for Comments: (rfc 3809), Juniper Networks, (Jun. 2004), 23 pgs.

Perkins, C., "IP Encapsulation Within IP", Network Working Group Request for Comment: (rfc 2003), IBM, (Oct. 1996), 13 pgs.

Rosen, E., "Multicast in MPLS/BGP IP VPNs", Internet Engineering Task Force (IETF) Request for Comments: (rfc 6513), Cisco Systems, Inc., (Feb. 2012), 79 pgs.

Talpade, R., "Multicast Server Architectures for MARS-based ATM multicasting", Network Working Group Request for Comments: (rfc 2149), (May 1997), 17 pgs.

Waitzman, D., et al., "Distance Vector Multicast Routing Protocol 1075 IGMP", Network Working Group: Request for Comments (rfc 1075), (Nov. 1988), 22 pgs.

Weinstein, Joseph, "Integrating Manets Into the Tactical Internet", BBN Tech Report # 8565, (May 2014), 6 pgs.

* cited by examiner

SYSTEM, DEVICE, AND METHOD OF DENSE-MODE MULTICAST TUNNELING USING INTERLAYER GROUP MEMBERSHIP CONTROL

BACKGROUND

There are a number of methods by which to route IP packet data between nodes (devices) in a domain of one or more networks. Unicasting refers to one-to-one communication of data between a single source and destination node. Multicasting, on the other hand, refers to one-to-many transmission of data from a source node to a group of downstream destination nodes (who are members of the group) by addressing the data using a single multicast address that refers to all members of the group. In a multicast system, when packets are sent to the multicast address from the source, routers forward the packet to other routers to reach the group members following a route or routes established by a multicast routing protocol. Each router receives packets through an upstream link or links from the source, and forwards the packets out downstream links towards the group members selected by the multicast routing protocol. Packets can be routed either towards the group members or away from the source. The latter of these routing techniques is called reverse path routing and is used extensively in IP multicasting, such as in protocols Protocol-Independent Multicast Dense Mode (PIM-DM) [RFC 3973] or Distance Vector Multicast Routing Protocol (DVMRP) [RFC 1075]. In reverse path routing, multicast packets flow away from the source along a tree rooted at the source. Dense-mode reverse path multicast routing protocols, such as PIM-DM and DVMRP, are used in multicasting groups in which group members are somewhat densely distributed throughout the domain and an excessive number of sources per group do not exist. Notable, however, is that each router operating in dense-mode has to accept all multicast traffic admitted to any of its upstream links, making decisions on whether to forward only after receiving the packets. This can result in unwanted traffic on parts of the upstream link under the circumstances that multiple routers are attached to the same upstream link, some of which have downstream group members for which the router is responsible to forward the multicast traffic and some of which do not.

In certain circumstances, multicasting may take place using multiple networks. In particular, multicasting may take place using tunneling across a second, lower layer network (which itself may or may not contain any group members) to reach one or more group members on the original network. One example of tunneling is the use of Virtual Private Networks (VPNs). In unicast routing, edge devices of the lower layer network are used as entry and exit points of a tunnel to carry unicast traffic, which is then further routed to its destination on the original network. Likewise, in multicast routing, edge devices of the lower layer network are used as entry and exit points of a tunnel to route multicast traffic, which is then further routed to downstream members in the original network. As edge routers employing a dense-mode reverse-path multicast routing algorithm, however, must accept all multicast traffic admitted to the tunnel, this causes inefficiencies in routing when tunneling is used, as one or more of the edge devices may not have any downstream group members to which to pass the multicast traffic.

Accordingly, there is a need for more efficient method of dense-mode multicasting when tunneling is used.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In some embodiments, efficient use of lower layer network resources when tunneling dense-mode multicast traffic across that lower layer network may be established by selective control of lower layer multicast group membership by an upper layer dense-mode routing protocol. In one particular embodiment, interlayer group membership control may be combined with control messages to eliminate unnecessary distribution through the lower layer network of multicast data to exit multicast tunneling edge devices from that lower layer network, while retaining the ability of the exit multicast tunneling edge devices to continue to receive subsequent multicast data for other multicast groups or from other sources. The upper layer control messages may travel along the same path as the multicast data, but be immune from control by lower layer group membership restrictions selectively established by the multicast tunneling edge devices.

Different embodiments may improve the efficiency of multicast distribution when using a dense-mode IP multicast protocol in a multi-layer environment. In one embodiment, multicasting may be provided through a Virtual Private Network (VPN) using one or more Provider Multicast Service Interfaces (PMSIs) in the upper layer network. In another embodiment, multicasting may be provided through an IP or other network layered across segmented local area networks (LANs) and wide area networks (WANs). In another embodiment, multicasting may be provided through an IP network layered over a lower layer network such as a mobile ad hoc network (MANET), Asynchronous Transfer Mode (ATM) network, packet-switched X.25 network, segmented Ethernet or a multi-hop network with an internal routing system configured to forward packets from one edge device to another across multiple links through one or more switches or routers. In yet another embodiment, multicasting may be provided through an IP or other network layered over another IP network, using IPSec (IP Security Protocol), Generic Routing Encapsulation (GRE) tunnels, or IP in IP (IPIP) encapsulation. In some embodiments, interlayer group membership requests from a dense-mode reversed-path multicast routing may be generated by a multicast tunneling edge device, eliminating continued reception of multicast traffic from all multicast groups. These group membership requests may enable multicast routing on the lower layer network to establish a selective distribution tree for each multicast group, rather than delivering all multicast traffic to every edge device.

Figure 1:
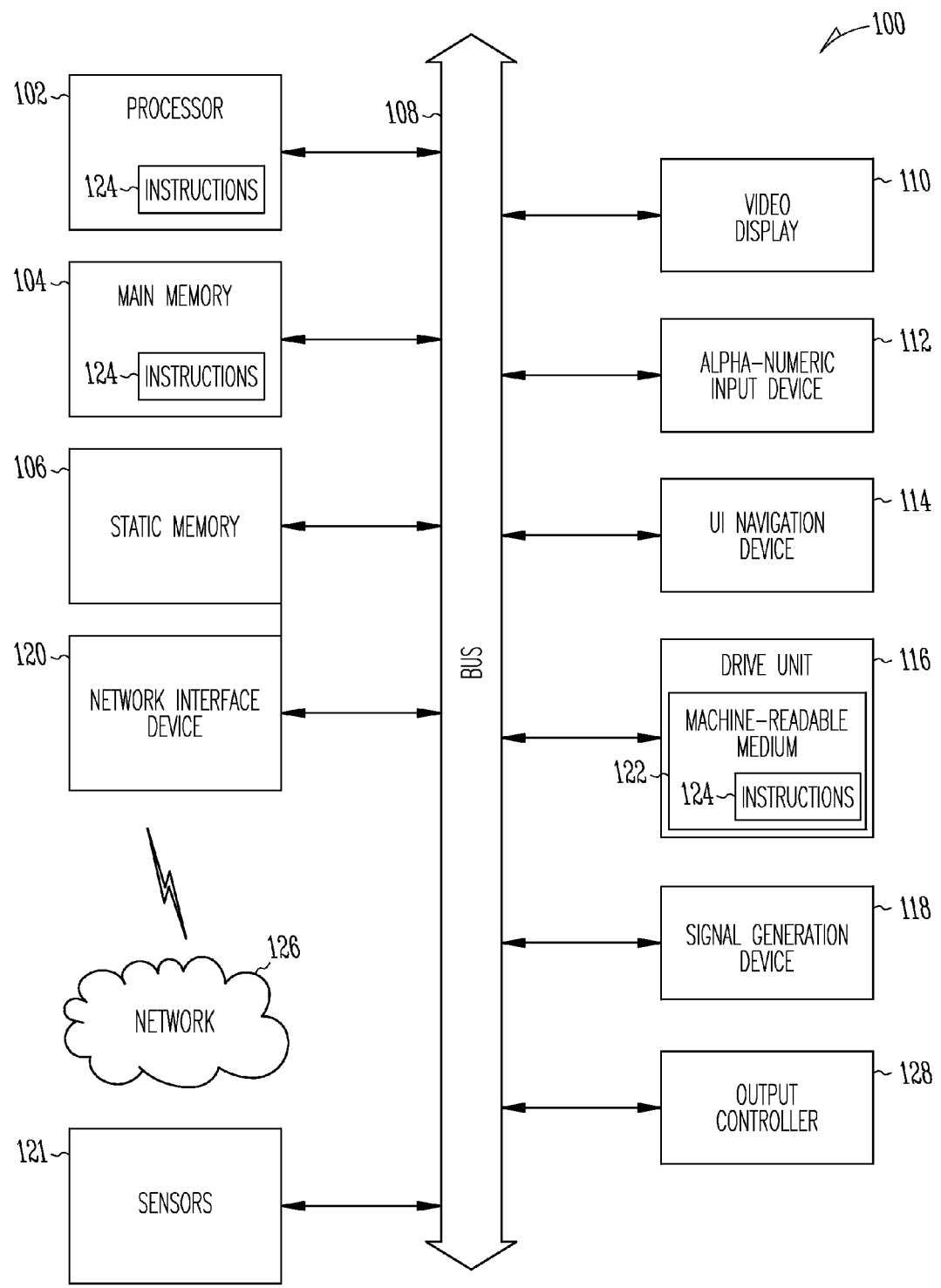
FIG. 1 is a block diagram illustrating a multicast tunneling device in accordance with some embodiments.

FIG. 1 illustrates a block diagram of a multicast tunneling edge device in accordance with some embodiments. The multicast tunneling edge device 100 may be connected (e.g., networked) to other nodes through one or more network interface devices 120 connected to one or more networks. The multicast tunneling edge device 100 may receive data via one or more of the network interface devices 120, and forward the data out one or more of the network interface devices 120. The format of the outgoing data may or may not be the same as the format of the incoming data. In certain embodiments, the multicast tunneling edge device may encapsulate packets received via one or more of the network interface devices 120 for tunneling out one or more of the other network interface devices 120, and decapsulate packets received through a tunnel over one or more of the other network interface devices 120 for forwarding out one or more other network interface devices 120. Furthermore, the multicast tunneling edge device 100 may exchange routing or control information with one or more other multicast tunneling edge devices or routers in accordance with one or more routing or control protocols, and use that information to determine how to forward data in accordance with the rules of that routing or control protocol.

The multicast tunneling edge device 100 may additionally perform any one or more of the techniques (e.g., methodologies) discussed herein. The multicast tunneling edge device 100 may additionally operate in the capacity of a server, a client, or both in server-client network environments. In an example, the multicast tunneling edge device 100 may additionally act as a peer machine in peer-to-peer (P2P) (or other distributed) network environment. The multicast tunneling edge device 100 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single node is illustrated, the term "multicast tunneling edge device," "router," "computer" or "node" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer the systems (e.g., a standalone, client or server computer the system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Multicast tunneling edge device 100 may include a hardware processor 102 (e.g., a central processing unit (CPU), a GPU, a hardware processor core, or any combination thereof), a main memory 104 and a static memory 106, some or all of which may communicate with each other via an interlink (e.g., bus) 108. The multicast tunneling edge device 100 may further include a display unit 110, an alphanumeric input device 112 (e.g., a keyboard), and a user interface (UI) navigation device 114 (e.g., a mouse). In an example, the display unit 110, input device 112 and UI navigation device 114 may be a touch screen display. The multicast tunneling edge device 100 may additionally include a storage device (e.g., drive unit) 116, a signal generation device 118 (e.g., a speaker), a network interface device 120, a medical device, a wearable device, and one or more sensors 121, such as a global positioning the system (GPS) sensor, compass, accelerometer, or other sensor. The multicast tunneling edge device 100 may include an output controller 128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). The multicast tunnelling device may also include an encryption module for encrypting and decrypting traffic received or forwarded through one or more of its network interfaces.

The storage device 116 may include a machine readable medium 122 on which is stored one or more sets of data structures or instructions 124 (e.g., software) embodying or utilized by any one or more of the techniques or functions described herein. The instructions 124 may also reside, completely or at least partially, within the main memory 104, within static memory 106, or within the hardware processor 102 during execution thereof by the multicast tunnelling edge device 100. In an example, one or any combination of the hardware processor 102, the main memory 104, the static memory 106, or the storage device 116 may constitute machine readable media.

While the machine readable medium 122 is illustrated as a single medium, the term "machine readable medium" may include a single medium or multiple media (e.g., a centralized or distributed database, and/or associated caches and servers) configured to store the one or more instructions 124.

The term "machine readable medium" may include any medium that is capable of storing, encoding, or carrying instructions for execution by the multicast tunneling edge device 100 and that cause the multicast tunneling edge device 100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 124 may further be transmitted or received over a communications network 126 using a transmission medium via network interface device 120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications The system (UMTS) family of standards, peer-to-peer (P2P) networks, among others. In an example, the network interface device 120 may include one or more physical jacks (e.g., Ethernet, coaxial, or phone jacks) or one or more antennas to connect to the communications network 126. In an example, the network interface device 120 may include a plurality of antennas to wirelessly communicate using at least one of single-input multiple-output (SIMO), multiple-input multiple-output (MIMO), or multiple-input single-output (MISO) techniques. In some examples, the network interface device 120 may wirelessly communicate using Multiple User MIMO techniques. The term "transmission medium" shall be taken to include any intangible medium that is capable of storing, encoding or carrying instructions for execution by the multicast tunnelling edge device 100, and includes digital or analog communications signals or other intangible medium to facilitate communication of such software.

Figure 2:
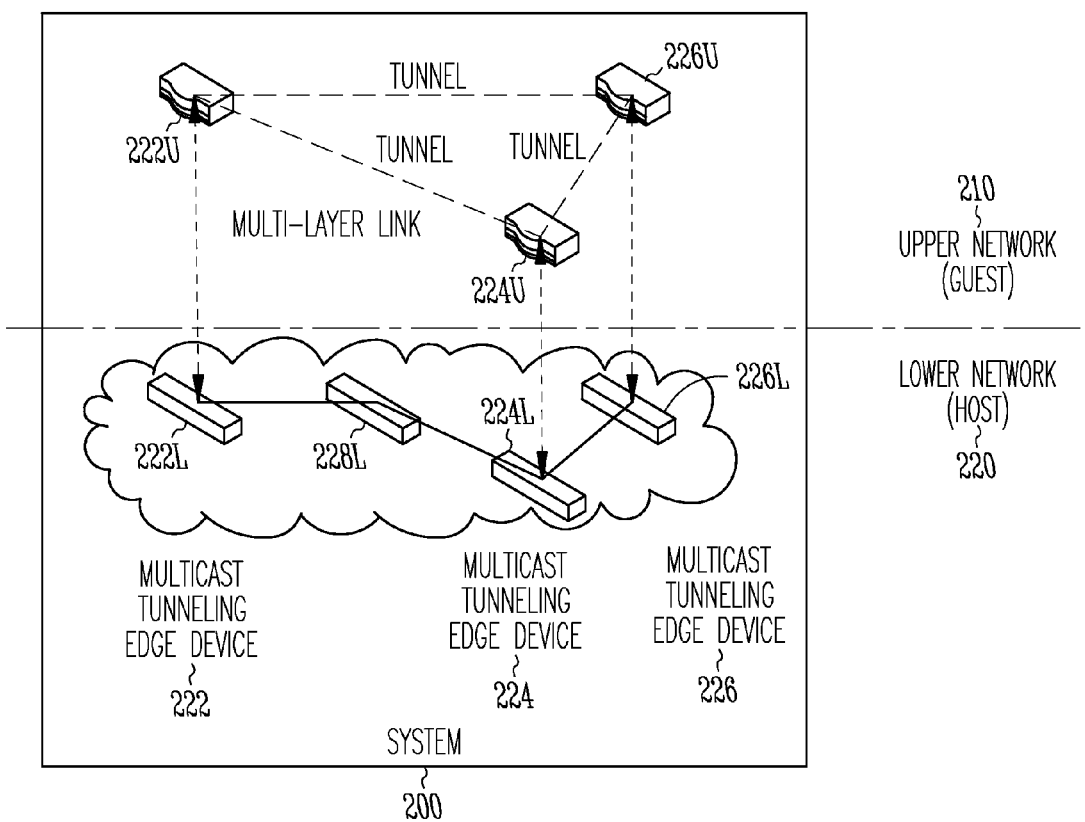
FIG. 2 illustrates a system of multicast tunneling devices among which multicast traffic is distributed via tunneling over a first, lower layer network in accordance with some embodiments.

FIG. 2 illustrates a system of multicast tunneling edge devices among which multicast traffic is distributed via tunneling over a first, lower layer network in accordance with some embodiments. The system illustrated in FIG. 2 may include three or more multicast tunneling edge devices 222, 224, 226. Each multicast tunneling edge device may be an instance of a multicast tunneling edge device such as multicast tunneling edge device 100. The multicast tunneling edge devices 222, 224, 226 may respectively include lower layer modules 222L, 224L, 226L and 228L and upper layer modules 222U, 224U, and 226U. The upper layer modules 222U, 224U, 226U may be connected to a first, lower layer network 220 through one or more of the network interface devices of the lower layer modules 222L, 224L, and 226L. The upper layer modules 222U, 224U, 226U may be disposed in a second, upper layer network 210. The multicast tunneling edge devices 222, 224, 226 may distribute unicast data, multicast data, and control information among themselves across the lower layer network 220 through services provided by the lower layer network 220 in accordance with the network protocols that the multicast tunneling edge devices 222, 224, 226 employ. The multicast tunneling edge devices 222, 224, 226 may serve as hosts or applications on the lower layer network 220; that is, the multicast tunneling edge devices 222, 224, 226 may inject data into the lower layer network 220 from the upper layer network 210 and extract data from the lower layer network 220. Optionally, the multicast tunneling edge devices 222, 224, 226 may also serve as routers for the lower layer network 220; that is, the multicast tunneling edge devices 222, 224, 226 may receive data from the lower layer network 220 through one or more of the network interface devices of the lower layer modules 222L, 224L, and 226L and forward the data back into the lower layer network 220 through the same network interface or another of the network interface devices of the lower layer modules 222L, 224L, and 226L. The lower layer network 220 may contain other routers, hosts, and edge devices in addition to the multicast tunneling edge devices 222, 224, 226. The lower layer network 220, and any additional routers that it may contain, such as module 228L, may be used for communication among the multicast tunneling edge devices comprising the system. Although three multicast tunneling edge devices are shown, it is understood that the system 200 may contain fewer or a greater number of multicast tunneling edge devices.

Figure 3:
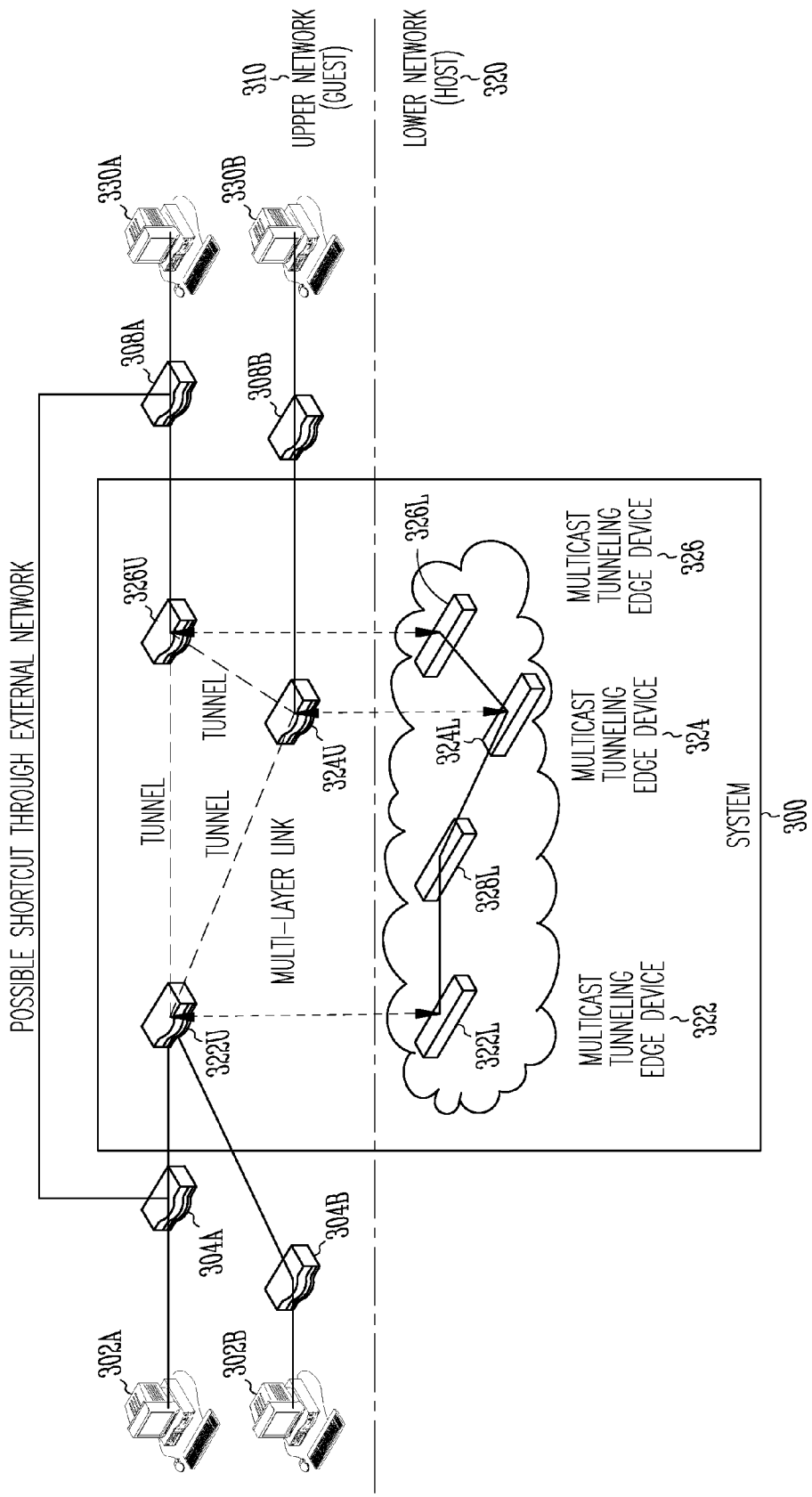
FIG. 3 illustrates the system of FIG. 2 embedded in a second, external, upper layer network within which multicast traffic is routed using a dense-mode reverse-path routing protocol in accordance with some embodiments.

FIG. 3 illustrates the system of FIG. 2 embedded in a second, external, upper layer network within which multicast traffic is routed using a dense-mode reverse-path routing protocol in accordance with some embodiments. In FIG. 3, the system 300 again may include the three or more multicast tunneling edge devices of the system labeled "Multicast Tunneling Edge Device 322", "Multicast Tunneling Edge Device 324", and "Multicast Tunneling Edge Device 326". The network links among them through the first, lower layer network 320 is depicted in these figures as a "cloud" at a lower position in the diagram than the higher-layer network in which the system is embedded. To illustrate the operation of the system, the system 300 is shown embedded in an external network 310 that may contain additional routers and hosts, including the external potential multicast sources 302a and 302b, the external potential multicast destinations 330a and 330b, the external multicast routers 304a, 304b, 308a, and 308b, and the network links among them. The external network 310, hosts, and routers 304a, 304b, 308a, and 308b are not part of the system 300 and may vary in number, arrangement, and configuration from that shown. Besides possible route(s) from multicast sources such as sources 302a and 302b to the multicast destinations such as destinations 330a and 330b through the system 300, the external network 310 may provide possible alternative routes from the multicast sources 302a and 302b to the multicast destinations 330a and 330b through other network links such as the route through the network link marked "possible shortcut through external network". One or more of the multicast tunneling edge devices 322, 324, or 326 comprising the system 300 may connect to the higher-layer network through one or more of the network interface devices of the respective upper layer module 322U, 324U, or 326U. The multicast tunneling edge devices 322, 324, or 326 of the system 300 may exchange unicast data, multicast data, and control information between themselves and other components of the higher-layer through services provided by the higher-layer network in accordance with the network protocols employed by the higher-layer network. The network protocols and data formats of the higher-layer network may be different from those of the lower layer network. The multicast tunneling edge devices may serve as multicast routers for the upper layer network, as unicast routers for the upper layer network, or both. Although shown as two disjoint networks, in some embodiments the upper layer network may be the same as the lower layer network, in which case that network is tunneled across itself.

In FIGS. 2 and 3, each multicast tunneling edge device of the system 300 is depicted as comprised of two communicating but distinct modules: an upper layer module such as module 322U of multicast tunneling edge device 322, and a lower layer module such as module 322L of the same multicast tunneling edge device. The lower layer module 322L, 324L, 326L may perform functions for communication with the other multicast tunneling edge devices of the system through the lower layer network 320. The lower layer module 322L, 324L, 326L may function as a host or application of the lower layer network 320, and may also function as a router for the lower layer network 320. Similarly, the upper layer module 322U, 324U, 326U may perform functions for communication with routers and nodes external to the system through the upper layer network 310. In some embodiments, it may function as a router in the upper layer network 310. Hence, the upper layer module 322U, 324U, 326U may be referred to as an upper layer router. In other embodiments, the upper layer module may serve as an intelligent bridge for the upper layer network. As such, it may monitor multicast routing control traffic exchanged among other multicast routers, without participating as a router in the routing protocol itself. In that case, it may be referred to as an upper layer bridge, and a multicast router to which it is attached in the upper layer network may be referred to as an edge router. Although shown and described as physically separate modules, the upper layer modules 322U, 324U, and 326U and lower layer modules 322L, 324L, 326L may physically be the same multicast tunneling edge device, but may be logically partitioned into components that serve the different networks 310, 320. The upper layer module 322U, 324U, 326U and lower layer module 322L, 324L, 326L may communicate with each other by means of subroutine calls, message exchange, or any other mechanism appropriate to their implementation. Routers, hosts, and other devices in the upper layer network 310 that do not have interfaces onto a lower layer network 320 may not be part of a system 300 and may not have lower layer modules. Likewise, internal routers of the lower layer network 320, such as router 228L, may not connect to upper layer network 310 and may not necessarily have upper layer modules. In some embodiments, a system 300 may be embedded in two or more upper layer networks, in which case some multicast tunneling edge devices may have two or more upper layer modules, one for each of the upper layer networks in which the system 300 is embedded. In some embodiments, some multicast tunneling edge devices may serve as a multicast tunneling edge device for two or more the systems 300, in which case those multicast tunneling edge devices may have two or more lower layer modules, one for each of those the systems 300.

In FIG. 3, multicast traffic may be distributed within the upper layer network 310 from the multicast sources to the multicast destinations, in accordance with the routes established by a dense-mode reverse-path multicast routing protocol. The system 300 may tunnel the multicast traffic and the related control messaging of the dense-mode reverse-path multicast routing protocol across the lower layer network 320. An multicast tunneling edge device at which multicast traffic enters the system 300 is referred to herein as an multicast tunneling entry device, and a multicast tunneling edge device at which multicast traffic exits the system 300 is referred to herein as an multicast tunneling exit device. An multicast tunneling edge device may be both a multicast tunneling entry device for certain multicast traffic and a multicast tunneling exit device for other multicast traffic at the same time, depending upon the location of the sources and destinations for that traffic. Traffic from more than one source may enter the system 300 at the same multicast tunneling entry device; for example, in FIG. 3, traffic from multicast sources 302a and 302b all enter the system 300 at multicast tunneling entry device 322. Likewise, traffic for more than one destination may exit the system 300 through the same multicast tunneling exit device. In some embodiments, traffic from a single source may enter the system 300 at more than one multicast tunneling entry device.

As discussed above, in general, in a reverse-path multicast routing protocol, such as the IP multicast routing protocols PIM-DM [RFC 3973] or DVMRP [RFC 1075], multicast traffic may be distributed along a tree rooted at the source (or source proxy) to all potential group members. In constructing the multicast tree, a multicast router at each node may forward multicast traffic received at an upstream interface (an interface towards the source) out each downstream interface (an interface towards group members farther from the source) towards group members downstream of the router. In some embodiments, dense-mode multicast traffic for a group may be distributed along a branch to all potential members of that group, regardless of whether or not that potential member is an actual member of the group. In this case, certain branches of the multicast tree may be unused; that is, a multicast router may determine that no downstream routers belong to the group and thus it does not need to receive multicast traffic for that group. Accordingly, such branches of the tree may be pruned using pruning control messages, sent from the routers at the base of the branch being pruned, to the nearest upstream router. This pruning may take place reactively, after a multicast router receives incoming multicast traffic for a source and group for which it has no downstream members. Thus, a dense-mode multicast router may not necessarily know whether it has any downstream members for a particular (source, group) pair (SG pair) until after it has begun forwarding data downstream towards such members as may or may not exist. An SG pair may define both the source of packets and the group to which the packets are destined.

A multi-layer link is formed when a system, such as the system 200, tunnels data and control information from a second (upper layer) network across at least one other network. In FIG. 3, the system 300 may tunnel data and control information from the upper layer network 310 across the lower layer network 320 connecting the multicast tunneling edge device 322, the multicast tunneling edge device 324, and the multicast tunneling edge device 326, which form the endpoints of the tunnel or tunnels across the lower layer network 320. The multicast tunneling edge devices 322, 324, 326 may tunnel upper layer data and control information across the lower layer network 320 by embedding the upper layer data and control information in packets conforming to the network protocols of the lower layer network 320 and distributing the lower layer packets among themselves across the lower layer network 320. The network of tunnels itself may belong logically to the upper layer network 310. To other elements of the upper layer network 310, it may appear as if all edge routers of the system 300 are connected directly to each other through the tunnels across lower layer network 320, regardless of the actual pattern of interconnections provided by the lower layer network 320. Note that although the embodiments described herein refer to a two-layer system, systems with greater than two layers may be used. For example, one network may be tunneled over another, which may in turn be tunneled over yet another. Examples of tunneling one network over another include a VPN tunneled over the Internet [RFC5501, RFC6513], an IP network tunneled over a MANET [BBNTR8565], an ATM network [RFC2022, RFC2149, RFC2191], a packet-switched X.25 network, a segmented Ethernet, a segmented Local Area Network (LAN), a segmented WAN, or an IP network layered over another IP network through use of IPSec [RFC5374], GRE tunnels [RFC1701, RFC1702], or IPIP tunnels [RFC2003], or any other situation in which a multi-hop network with its own internal routing system for forwarding packets from one edge device to another across multiple links through one or more switches or routers serves as a link service provider for an IP network or any other kind of network. Data may be encrypted for tunneling across the lower layer network, as when tunneling is performed using IPSec [RFC5374].

The system 300 may arrange the tunnels across the lower layer network 320 in any of several ways. In one embodiment, all upper layer multicast groups may be carried by the same multicast tunnel. Every multicast tunneling edge device belonging to the system 300 may then be an exit point for the multicast tunnel. In some embodiments, the multicast tunnel may itself be implemented by a single lower layer multicast group, in which case the lower layer group may include, as members, every upper layer multicast host or multicast tunneling edge in system 300. The set of tunnel endpoints (lower layer members) may be independent of the upper layer group members. Hence, every multicast message tunneled over the lower layer network may be delivered to every edge router of the system, regardless of whether that router has any downstream members of that group.

In one embodiment, each upper layer multicast group may map to a different multicast tunnel. The exit points of these tunnels may include only those multicast tunneling edge devices of the system 300 that are members of the group, or have downstream members for the group. In some embodiments, each of the multicast tunnels may itself be implemented by a separate lower layer multicast group, in which case the corresponding lower layer groups may include, as members, only those multicast tunneling edge devices that are members of the upper layer groups or have downstream members for the group. The tunnel endpoints (lower layer group members) may be selected dynamically based upon upper layer multicast routing decisions and in one embodiment may be controlled by manipulating multicast group memberships on the lower layer network. Intermediate models, in which one or more upper layer groups map to the same tunnel, are also possible.

A multicast tunnel may be source-specific or any-source. A source-specific tunnel may carry only traffic that enters the multi-layer link at a single entry point and a separate tunnel may be used for each such entry point. An any-source tunnel may carry traffic that enters the multi-layer link at any entry point. A source-specific tunnel can be identified by specifying the address on the lower layer network of its entry point, and by specifying an identifier (referred to herein as the lower layer group ID) that may implicitly or explicitly specify its exit points. For an any-source tunnel, the lower layer group ID alone may be sufficient to identify the tunnel. The process of a multicast tunneling edge device configuring itself as an exit point of the tunnels specified by a particular lower layer group ID will be referred to as joining the lower layer group.

A multicast tunnel across a lower layer IP network may be constructed, for example, by embedding upper layer multicast traffic in lower layer IP multicast packets using a tunneling protocol, such as GRE [RFC1701, RFC1702], IPIP [2003], or IPSec Tunnel Mode [RFC5734]. The address of the lower layer group corresponding to the upper layer multicast group may serve as the destination address of the lower layer multicast packets, and the lower layer address of the multicast tunneling edge device at which the traffic entered the multi-layer link may serve as the source address. Source-specific tunnels across a lower layer IP network may be implemented using source-specific multicast [RFC3569] on the lower layer IP network. If the lower IP network does not support source-specific multicast, source-specific multicast tunnels may be implemented by using any-source multicast on the lower layer IP network, and filtering the traffic by source at the tunnel endpoints. Conversely, any-source multicast tunnels may be constructed across a lower layer IP network by using any-source multicast on the lower network. To join or leave a particular lower layer group, the lower layer modules may employ the standard IGMP mechanisms [RFC1112], [RFC2236], or [RFC3376]. Multicast routing through the lower layer network can be provided by any standard or custom IP multicast routing protocol, such as DVMRP[RFC1075], PIM-DM [RFC3973], PIM-SM [RFC2362, RFC4601], or MOSPF [RFC1584], which may or may not itself be a reverse-path dense-mode routing protocol. In certain embodiments, the data may be encrypted using IPSec for transfer through the tunnel.

As another example, a multicast tunnel across an Ethernet, a MANET, a LAN, or a WAN which provides its own internal multicast capability can be constructed using the same strategy. In such cases, the lower layer network effectively serves as a link service provider to the upper layer network. The address of the lower layer group corresponding to the upper layer multicast group may serve as the destination address of the lower layer multicast packets, and the lower layer address of the multicast tunneling edge device at which the traffic entered the multi-layer link may serve as the source address. To join or leave a particular lower layer group, the lower layer modules manipulate the configuration of their interfaces onto that Ethernet, MANET, LAN, or WAN in the manner appropriate to that network type. Such tunnels may be source-specific or any-source, depending upon the capabilities of the link service provider. This dynamic configuration of lower-layer group memberships is likely to be particularly beneficial when the lower-layer network consists of multiple segments or links and employs its own internal routing system to route multicast traffic across those multiple segments or links. In certain embodiments, the data may be encrypted for carriage across the lower-layer network.

As another example, a multicast tunnel across a lower layer ATM network can be constructed by use of ATM point-to-multipoint links [RFC2022]. Such tunnels may naturally be source-specific, but an any-source tunnel may be implemented as the union of multiple point-to-multipoint links.

A mapping may be provided from upper layer SG pairs to lower layer group IDs (tunnel exit point sets) LowerGroup (S,G). Likewise, a mapping LowerAddr(E) may be provided from upper layer addresses of E of multicast tunneling edge devices to their lower layer addresses LowerAddr(E). In different embodiments, this mapping may be specified by a table lookup, by an algorithm such as a hash algorithm, or by other means; however, for consistency all multicast tunneling edge devices in a system 200 agree on the mapping. In various embodiments, the mapping LowerGroup(S,G) from SG pairs to lower layer group IDs (tunnel exit point sets) may depend solely upon the multicast group G, the multicast source S, or both the source S and group G. In some embodiments, more than one upper layer group may map to the same multicast tunnel. The source-specific multicast tunnel corresponding to a particular SG pair may be identified as (LowerAddr(Entry(S),LowerGroup(S,G))). If, for any two SG, S'G' pairs, LowerAddr(Entry(S))=LowerAddr(Entry(S')) and LowerGroup(S,G)=LowerGroup(S', G'), multicast traffic for both SG pairs may be carried over the lower layer network by the same multicast tunnel. Likewise, an any-source multicast tunnel corresponding to a particular SG pair may be identified as (*,LowerGroup(S, G)). If, for any two SG, S'G' pairs, LowerGroup(S,G)=LowerGroup(S',G'), multicast traffic for both SG pairs may be carried over the same lower layer network by the same any-source multicast tunnel.

Previously, a dense-mode reverse-path multicast router with potential downstream members was set to a mode in which the router received all dense-mode multicast traffic for all groups admitted to the upstream link. Each upstream multicast router in this case made forwarding decisions on an interface-by-interface basis, i.e., either forwarding all traffic for a particular source and group to every downstream multicast router and host on a particular outgoing interface or to no downstream multicast router or host on that interface. This is inefficient when an upper layer link is implemented by tunneling across a lower layer network, especially when group membership and/or sources is tightly localized, as every upper layer multicast packet on an upper layer link is distributed by the lower layer network to every upper layer multicast router on that link, regardless of whether or not that edge router actually has any downstream members for the particular group. It also wastes capacity on the lower layer network. Allowing a router that has no downstream members for a group to cancel lower layer membership in the corresponding lower layer group, however, may cause problems for upper layer dense-mode multicast protocols because more than one multicast source may share the same entry router to the multilayer link, and hence the same set of tunnels across the lower layer network. An exit edge router from the lower layer network that cancels its lower layer membership for an original SG pair, also may be prevented from receiving multicast traffic associated with a new SG pair that maps to the same tunnel, that is, which enters the lower layer network at the same entrance router as the original source, group pair and maps to the same lower layer multicast group.

As above, to overcome these problems, selective control of lower layer multicast group membership by an upper layer dense-mode routing protocol may be effected by combining interlayer group membership control with upper layer control messages. The upper layer control messages may travel along the same upper layer path as the multicast traffic, in this case are unaffected by lower layer group membership restrictions. The upper layer control messages may be sent by an multicast tunneling entry device of the system 300 to each potential multicast tunneling exit device of the system 300 when the entry device receives multicast traffic from an upstream source (such as multicast source 302a or 302b) to inform the exit devices that the exit devices are to configure themselves to receive multicast traffic for the SG pair that will be tunneled across the lower layer network 320. To do so, the upper layer modules of the exit devices may instruct their corresponding lower layer modules to join the lower layer group (LowerAddr(Entry(S), LowerGroup(S,G)) or (*,LowerGroup(S,G)). The control messages are referred to herein as source active messages. In some embodiments, specific source active messages are not required on other kinds of links, preserving compatibility and interoperability on those links with standard dense-mode multicast routers.

Figure 4:
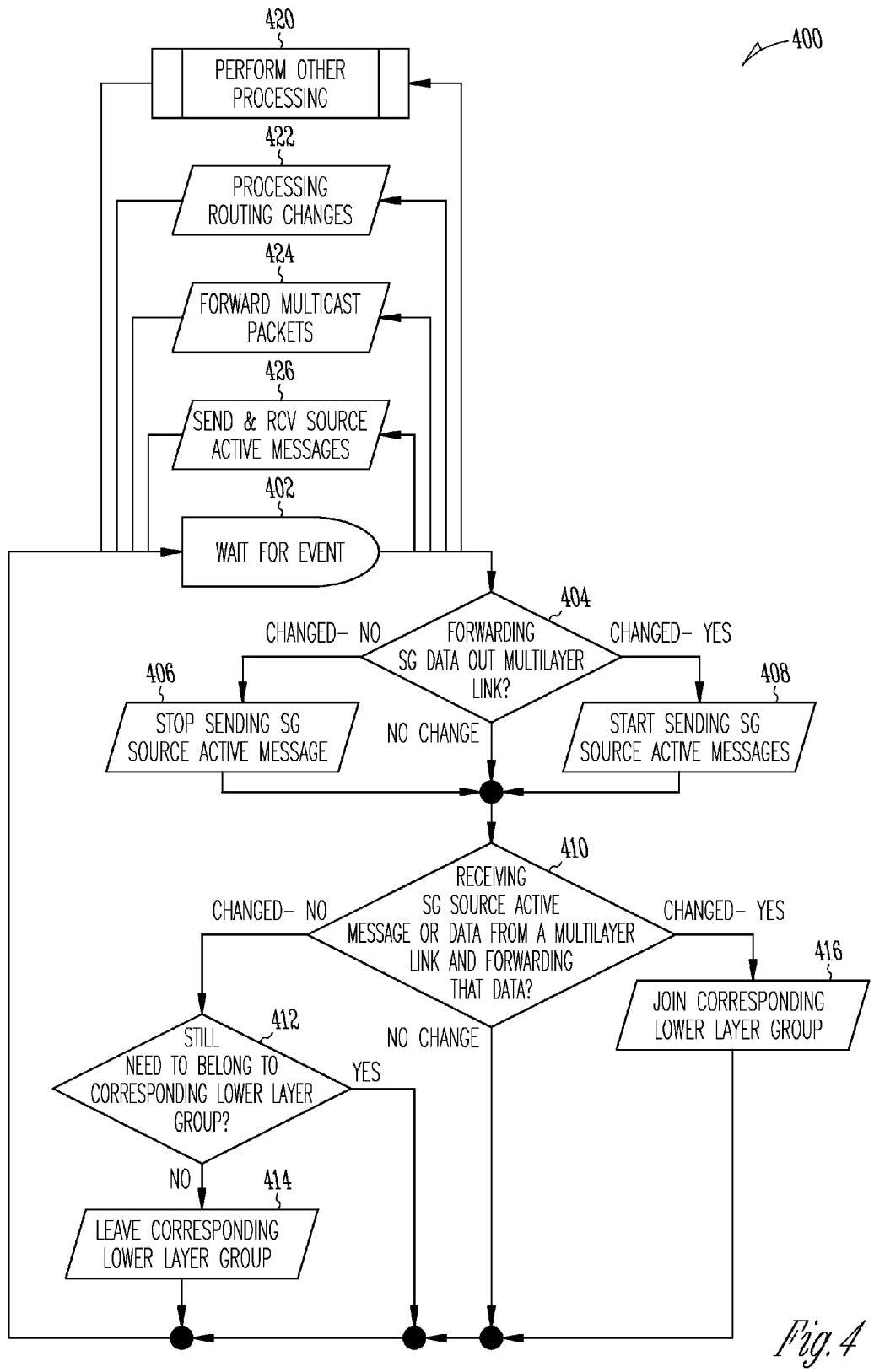
FIG. 4 illustrates a flowchart of a method in accordance with some embodiments.

FIG. 4 illustrates a flowchart of a method in accordance with some embodiments. In particular, FIG. 4 shows a flowchart of a method 400 that may be employed by a multicast tunneling edge device of a system to control lower layer group memberships and generation of source active messages in accordance with some embodiments. As illustrated, the multicast tunneling edge device may wait (step 402) for an event that may require a change in lower layer group memberships or in the generation of source active messages. This event may be a change in multicast routing as indicated by the upper layer multicast routing protocol, receipt of a source active message across a multi-layer link, a timeout, or any other event that may require a change in lower layer group memberships or in the generation of source active messages.

While waiting for such an event, the multicast tunneling edge device may perform other operations, such as the forwarding of unicast or multicast packets (step 424), the processing and forwarding of control messages of the upper layer routing protocol(s) and processing of any other routing changes (step 422), reception and, if required, periodic retransmission of source active messages (step 426), monitoring of user inputs, or others (step 420). Some of these other activities may themselves trigger events for an SG pair. When a triggering event occurs for some SG pair, the multicast tunneling edge device may execute an event processing loop including steps 404 through 416. If a triggering event affects more than one (S,G) pair, then the event processing loop may be repeated for each such (S,G) pair until all have been processed.

Steps 404 through 408 of the event processing loop concern the sending of Source Active messages. When a triggering event occurs for an SG pair, the multicast tunneling edge device may check (step 404) whether or not it is to start or stop forwarding multicast data for the SG pair out onto a multi-layer link.

In certain embodiments, the multicast tunneling edge device may itself function as a multicast router. Whether or not the multicast tunneling edge device is to start or stop forwarding multicast data for the SG pair onto the multi-layer link may be determined by the router by examining a routing database (step 422). The routing database may be maintained by the upper layer multicast routing protocol. In other embodiments, the multicast tunneling edge device may act as a multicast bridge. In that case, it may automatically assume that it is to forward any multicast data that it receives onto the multi-layer link.

In one embodiment, the multicast tunneling edge device determines it is to start forwarding multicast data for a particular SG pair. In this case, the multicast tunneling edge device may also start sending Source Active messages for that SG pair to all potential multicast tunneling exit devices on that multi-layer link (step 408).

In one embodiment, the multicast tunneling exit device determines it is to stop forwarding multicast data for a particular SG pair. In this case, the multicast tunneling edge device may stop sending Source Active messages for that SG pair to potential multicast tunneling exit devices on that multi-layer link (step 406).

In one embodiment, the multicast tunneling edge device determines there is no change in forwarding multicast data for the SG pair.

Steps 410 through 418 of the event processing loop may handle establishment of lower layer group memberships. In step 410, the multicast tunneling edge device may determine whether or not it is receiving Source Active messages from another multicast tunneling edge device on a multilayer link for another SG pair and is to forward the corresponding data out some other link or to a local application. Whether or not the multicast tunneling edge device is to forward multicast data received from a multilayer link for the other SG pair out some other link or to a local application may also be available from the routing database maintained by the upper layer multicast routing protocol (step 422).

If the multicast tunneling edge device determines it is starting to receive Source Active messages from another multicast tunneling edge device on a multilayer link for another SG pair and is to forward the corresponding data out some other link or to a local application, the multicast tunneling edge device may be an endpoint of the source-specific multicast tunnel (LowerAddr(Entry(S)),LowerGroup(S,G)) or the any-source multicast tunnel (*,LowerGroup(S,G)) carrying the multicast data for that group G from Entry(S). In response, in step 416, the multicast tunneling edge device may be a multicast routing exit device and may configure itself as an exit endpoint of that tunnel. In some embodiments, the upper layer module of the multicast tunneling exit device may inform the corresponding lower layer module that it is to join the lower layer source-specific multicast group (LowerAddr(Entry(S)),LowerGroup(S,G)) or any-source multicast group (*,LowerGroup(S,G)). In various embodiments, the information may be provided, for example, by messaging or subroutine calls between the upper layer module of the multicast tunneling exit device and its corresponding lower layer module.

If the multicast tunneling edge device determines it is no longer receiving Source Active messages or multicast data from another multicast tunneling edge device on a multilayer link for another SG pair or that it is no longer to forward multicast data from another multicast tunneling edge device on a multilayer link out some other link or to a local application, then the multicast tunneling edge device may determine (step 412) whether or not it is still to be an exit endpoint of the source-specific multicast tunnel (LowerAddr(Entry(S)),LowerGroup(S,G)) or the any-source multicast tunnel (*,LowerGroup(S,G)) carrying the multicast data for that group G from Entry(S). The multicast tunneling edge device may make this determination based upon rules described below.

If the multicast tunneling edge device determines that it is not to be an exit endpoint of the tunnel, the multicast tunneling edge device may cease functioning as an endpoint of that tunnel. Hence, in step 414, the multicast tunneling edge device may configure itself to no longer be an endpoint of that tunnel. In some embodiments, the upper layer module of the multicast tunneling edge device may inform the corresponding lower layer module that the lower layer module may leave the lower layer source-specific multicast group (LowerAddr(Entry(S)),LowerGroup(S,G)) or any-source multicast group (*,LowerGroup(S,G)).

Figure 5A:
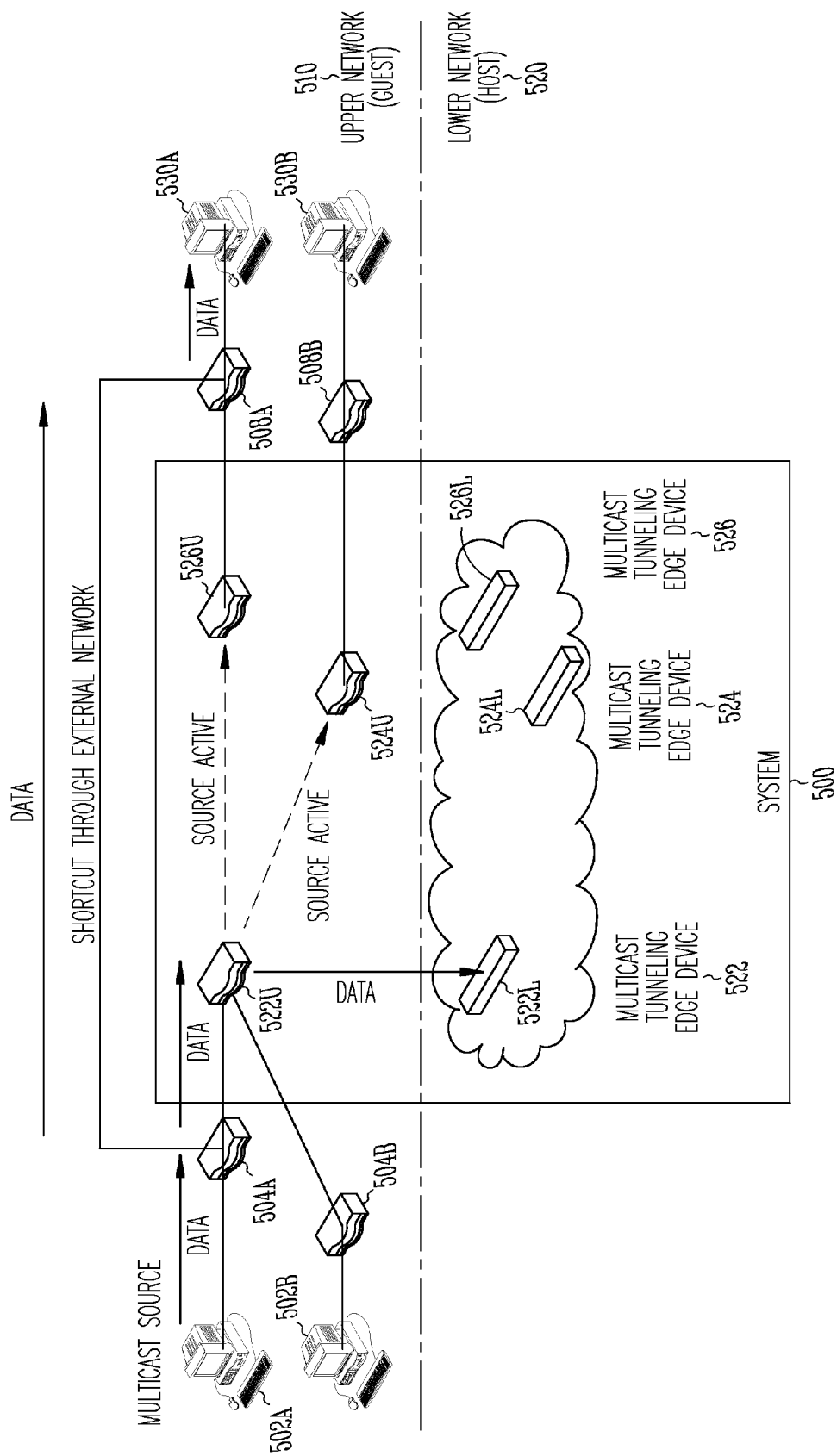
FIGS. 5A-5D illustrate the method of FIG. 4 in accordance with some embodiments.

FIGS. 5A-5D illustrate the method of FIG. 4 in accordance with some embodiments. As shown, the method may reduce unnecessary multicast traffic across the first, lower layer network. As shown in FIG. 5A, multicast traffic for an SG pair may be forwarded through an upper level network 510 in accordance with the reversed-path multicast protocol employed by that network from a source 502a to potential downstream group members 530a and 530b. The traffic may enter the system 500 at the multicast tunneling edge device 522 through its upper layer module 522U. However, the multicast traffic may not flow from the lower layer module 522L of the multicast tunneling edge device 522 across the lower layer network 520 to the multicast tunneling edge devices 524 and 526 because no multicast tunnel across the lower layer network 520 exists yet for the SG pair. In other words, the lower layer modules 524L, 526L of the multicast tunneling edge devices 524 and 526 may not yet be members of the lower layer source-specific group (LowerAddr(Entry (S)),LowerGroup(S,G)) or any-source group (*,LowerGroup(S,G)) corresponding to the SG pair. Instead, the multicast tunneling entry device 522 may send a source active message (a kind of control message) towards every potential multicast tunneling exit device in the system 500. This control message, which identifies the SG pair, may be propagated to the potential multicast tunneling edge devices as described below.

Figure 5B:
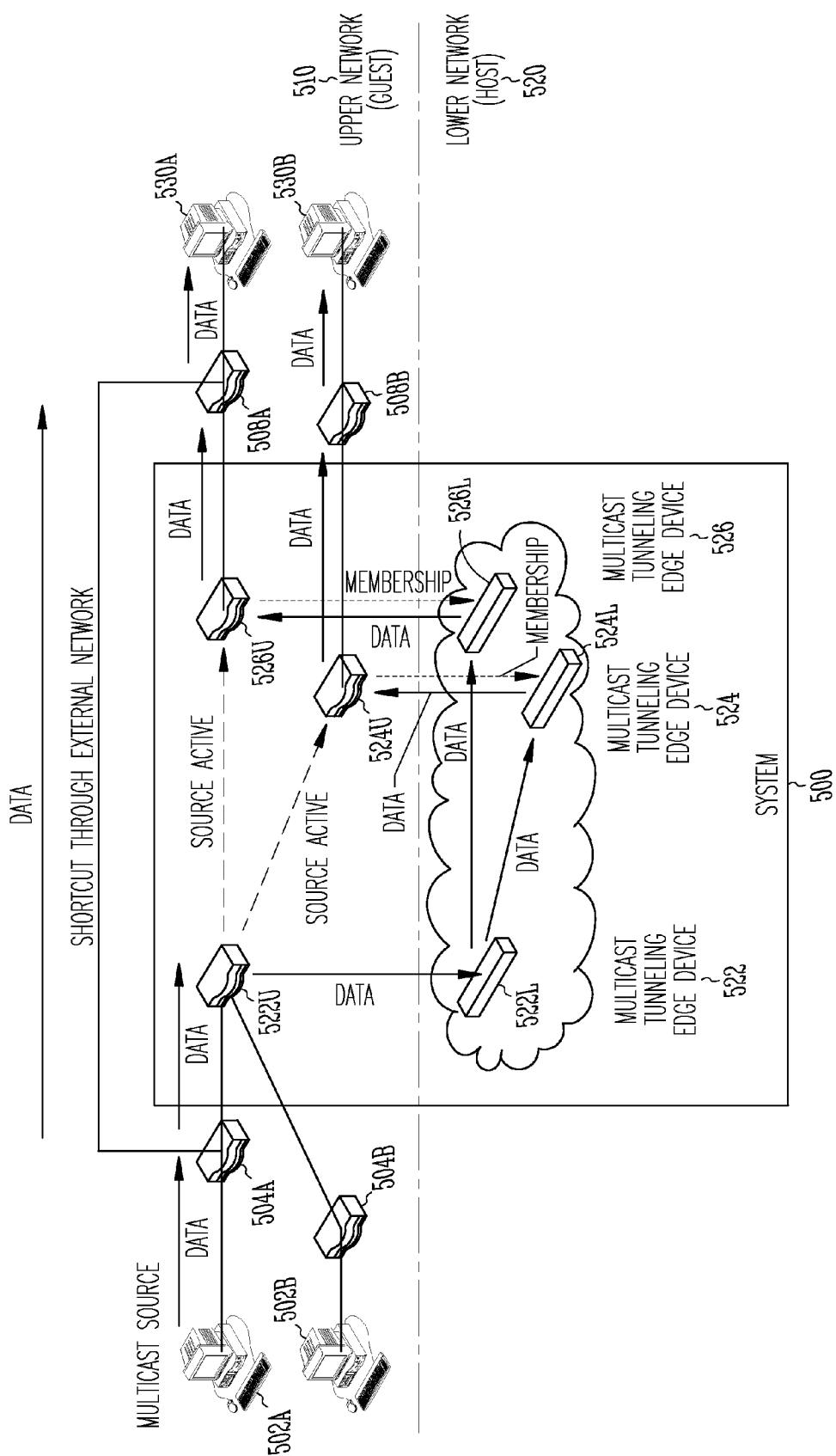

As shown in FIG. 5B, the upper layer modules 524U, 526U of multicast tunneling edge devices 524, 526 may receive the source active message from upper layer entry module 522U of multicast tunneling entry device 522, triggering an event at step 402 in FIG. 4. In accordance with step 416 of FIG. 4, the upper layer modules 524U, 526U of multicast tunneling exits device 524, 526 may inform their corresponding lower layer modules 524L, 526L that the lower layer modules 524L, 526L are to join the lower layer source-specific group (LowerAddr(Entry(S)),LowerGroup (S,G)) corresponding to the SG pair, or, if the lower layer does not support source-specific multicast, the any-source group (*,LowerGroup(S,G)).

The lower layer modules 524L, 526L of multicast tunneling exit devices 524, 526 may subsequently join the groups using procedures provided by the lower layer network 520. This may have the effect of adding the corresponding upper layer modules 524U, 526U as exit endpoints of the corresponding multicast tunnel across lower layer network 520. The multicast traffic may be subsequently forwarded across the tunnel from the multicast tunneling entry device 522 to each of the multicast tunneling exits device 524 and 526, and continue towards the downstream group members 530a and 530b.

Figure 5C:
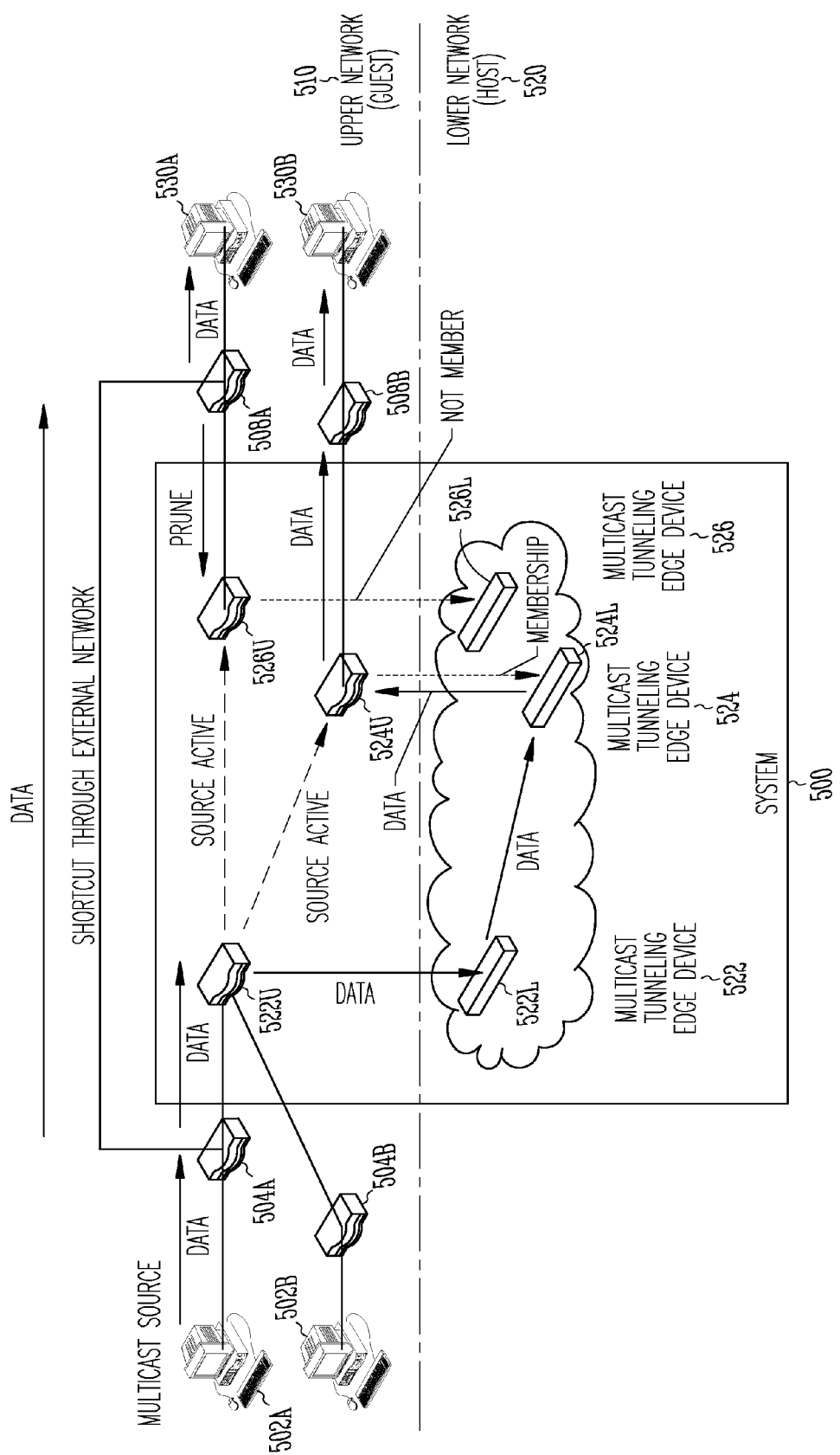

As shown in FIG. 5C, the multicast tunneling exit devices 524 and 526 may be able to cancel membership for multicast traffic associated with a particular SG pair on the lower layer network 520, even though other multicast tunneling edge devices of the same lower layer network 520 may still receive multicast traffic for the same SG pair or another SG pair that maps to the same tunnel. For example, as shown another, shorter, path may exist between the upstream router 504a and downstream router 508a for multicast traffic associated with a particular SG pair, so that downstream router 508a may not desire to receive multicast traffic for the SG pair across the system 500 even though downstream router 508b may receive this traffic. Downstream router 508a thus may initially receive multiple copies of the multicast traffic from source 502a, one via shortcut and the other via tunnel through the system 500. In response to receiving the duplicate multicast traffic, the downstream router 508a may proceed to indicate to the exit multicast tunneling edge device 526 through the mechanisms provided by the upper layer dense mode multicast routing protocol that the downstream router 508a does not desire to receive traffic from the exit edge router 526 for that particular SG pair. For example, if PIM-DM were used as the upper layer dense mode multicast routing protocol, the downstream router 508a may send a PIM-DM prune message to the upper layer module 526U of multicast tunneling exit device 526, cancelling membership in the group. If multicast tunneling exit device 526 is not itself an upper-layer multicast router, this prune message may be sent to upstream router 504a or 504b instead. The upper layer module 526U may receive or monitor the PIM-DM prune message, which may trigger an event at step 402 in FIG. 4. The upper layer module 526U may then determine in accordance with the rules described below whether or not its lower layer module 526L is still to be a member of lower layer group (LowerAddr(Entry(S)),LowerGroup(S,G)). If not, the upper layer module 526U informs the lower layer module 526L that the upper layer module 526U no longer desires to be a member of group (LowerAddr(Entry(S)),LowerGroup(S,G)) as shown in step 414 in FIG. 4. The lower layer module 526L may proceed to leave the group using mechanisms provided by the lower layer network 520 (shown in FIG. 5C as "not a member" between the upper layer module 526U and lower layer module 526L). As a result, the multicast tunneling edge device 526 may no longer be an exit point for the tunnel across lower layer network 520 carrying traffic for the SG pair, and the lower layer network 520 may no longer forward multicast traffic to the multicast tunneling exit device 526. Nevertheless, the multicast tunneling entry device 522 may continue to forward multicast traffic for the SG pair onto the lower layer network 520 and the multicast tunneling exit device 524 may continue to receive multicast traffic for the SG pair through the tunnel from the multicast tunneling entry device 522. Although the upper layer module 526U may, in accordance with PIM-DM rules, also forward the PIM-DM prune to the upper layer module 522U of entry multicast tunneling edge device 522 or to a multicast router upstream of it, the PIM-DM prune may have been cancelled by a PIM-DM join from the upper layer module 524U of multicast tunneling edge device 524.

Figure 5D:
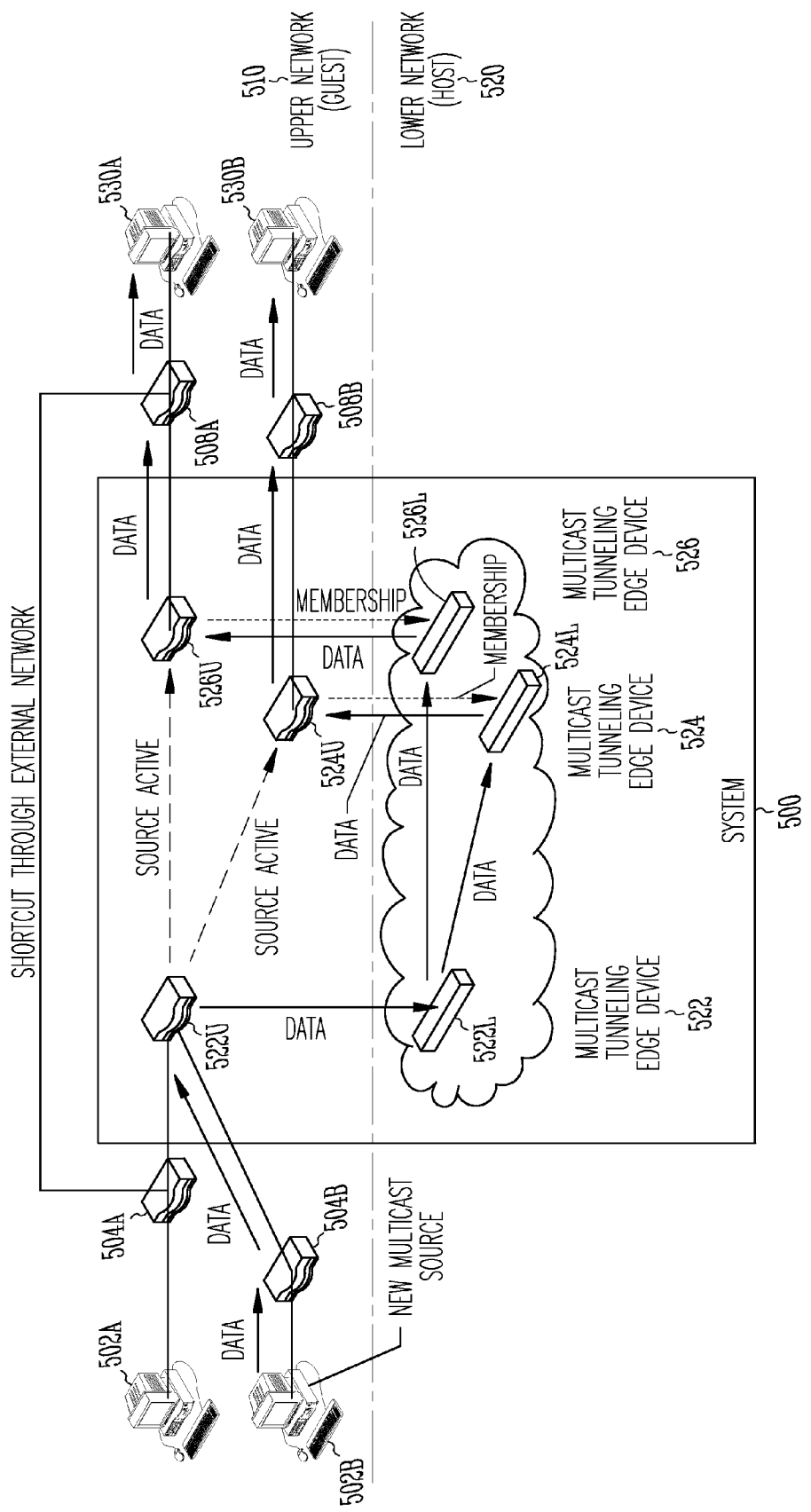

As shown in FIG. 5D, the multicast tunneling exit device 526 may continue to receive multicast traffic for other SG pairs after the multicast tunneling exit device 526 has cancelled its lower layer membership in group (LowerAddr(Entry(S)),LowerGroup(S,G)), even if that multicast traffic maps to the same tunnel and enters the system 500 at the same multicast tunneling edge device 522. As shown FIG. 5D, after the multicast tunneling exit device 526 has cancelled membership for multicast traffic associated with (LowerAddr(Entry(S)),LowerGroup(S,G)) on the lower layer network 520, a new multicast source S' (source 502b) may start sending multicast traffic to a group G' through the upstream router 504b and the multicast tunneling edge device 522. In one embodiment, the group G' may be the same as group G. In another embodiment, the group G' may be different than group G. This may trigger an event at step 402 in FIG. 4 in the multicast tunneling entry device 522, and in accordance with step 408 at FIG. 4, the multicast tunneling entry device 522 may send new source active messages identifying the new multicast source 502b and group to all potential multicast tunneling exit devices on the multilayer link. This may trigger an event at step 402 on the multicast tunneling exit device 526 and the multicast tunneling edge device 526 may establish (or re-establish) the lower layer membership in lower layer group (LowerAddr(Entry(S'),LowerGroup(S',G')) in accordance with step 416, even if this lower layer group is identical to the lower layer group (LowerAddr(Entry(S),LowerGroup(S,G)) in which the multicast tunneling exit device 526 had previously canceled its membership. This may allow multicast traffic from the new multicast source 502b to flow through the lower layer network 520 through the tunnel to the upper layer module 526U of multicast tunneling exit device 526. Thus, independent of previous group membership, the upper layer module 526U may become a member of the (new) group and thereby be provided multicast traffic from lower layer module 526L (even if previously cancelling multicast traffic). This is to say that membership of an multicast tunneling edge device in the lower layer network is no longer static or preconfigured, it is dynamic and dependent on conditions in the upper layer network, in particular whether downstream routers served by the upper layer exit router are to be provided multicast traffic via tunnel in the lower layer network.

In some embodiments, it may be possible to construct source-specific multicast tunnels across the lower layer network 520. In this case, it may be more efficient to use source-specific multicast tunnels to carry upper-level multicast traffic between multicast tunneling edge devices even if it is also possible to construct any-source tunnels and even if the upper-level traffic is itself any source. To determine whether a particular multicast tunneling edge device is to be an exit point of a source-specific multicast tunnel, the multicast tunneling edge device may examine the set of all SG pairs which map to the same lower layer source-specific tunnel (LowerAddr(Entry(S),LowerGroup(S,G)). If the multicast tunneling edge device receives source active messages for any SG pair in this set and, according to the usual rules of the upper layer dense-mode multicast routing protocol in use is to forward the multicast traffic using at least one downstream interface, then the multicast tunneling edge device should be an exit point for the source-specific tunnel (LowerAddr(Entry(S),LowerGroup(S,G)). The multicast tunneling edge device may, for example, make this determination at step 412.

If a source-specific multicast tunnel cannot be created, then any-source multicast may be used. To determine whether a particular multicast tunneling edge device is to be an exit point of an any-source multicast tunnel, the multicast tunneling edge device may examine the set of all SG pairs that map to the same lower layer any-source tunnel (*,LowerGroup(S,G)). If the multicast tunneling edge device receives source active messages for any SG pair in this set and, according to the usual rules of the upper layer dense-mode multicast routing protocol in use is to forward the multicast traffic using at least one downstream interface, then the multicast tunneling edge device should be an exit point for the any-source tunnel (*,LowerGroup(S,G)) over the lower layer network. The multicast tunneling edge device may, for example, make this determination at step 412. In some embodiments, multicast tunneling edge device may serve as an exit point of a multicast tunnel even when not required, even though duplicative, to ensure delivery of the multicast traffic in the event of router failure.

The control, i.e., source active, messages are originated by each multicast tunneling edge device in the system 500 (e.g., each multicast tunneling edge device on a particular multi-layer link) and sent to each other multicast tunneling edge devices in that the system 500. The source active messages may inform each of the multicast tunneling edge devices in the system 500 of the multicast sources upstream of the originating multicast tunneling edge device, and the multicast group(s) for which those sources are originating traffic. The source active messages may, for example, contain a single message that includes a list of SG pairs. Alternatively, a separate message may be used for each SG pair. In other embodiments, intermediate forms may be used. For example, a group listing message may be used for each source. The group listing message lists all the groups for which the source is originating traffic. Alternatively, a source listing message may be used for each group. The source listing message may list all the sources upstream of the originating multicast tunneling edge device that are originating traffic for that group. Lists that are too long to fit in a single message may be fragmented across multiple messages. However, all multicast tunneling edge devices in a particular instance of the system 500 are to agree on the format(s) to be used on that link. These format(s) may, or may not, be the same as those used by other instances of the system 500.

Similarly, the source active messages may be distributed by various mechanisms in different embodiments, such as being multicast to a multicast group (such as ALL_ROUTERS or ALL_PIM_ROUTERS group), which is mapped to a multicast tunnel that had every multicast tunneling edge device on that multi-layer link as members. Alternatively, the source active messages may be unicast individually to each multicast tunneling edge device on the multi-layer link. In either case, the source active messages may be repeated periodically and further may be carried by a non-reliable transport mechanism. Alternatively, a reliable transport mechanism may be used, in which case only changes in the set of active sources may be transmitted to reduce the amount of traffic. Changed source refresh messages may, for example, be sent at steps 404 and 406. If periodic source active messages are used, then the source active messages may, for example, be sent at step 426. Again, all multicast tunneling edge device in a particular instance of the system 500 are to agree on the mechanism(s) to be used. These mechanism(s) may, or may not be, the same as those used on other instances of the system 500. However, these source active messages may not be carried over lower layer network 520 using the same multicast tunnel used to carry user traffic for the SG pair or group without interfering with the ability to prune that multicast tunnel to include as endpoints only those multicast tunneling edge devices with downstream members for the group.

The source active messages may include other control message functionality on the multi-layer link used for normal operation of the upper layer dense mode reversed path multicast routing protocol. For example, the source active messages may, on multi-layer links, include state refresh message functionality employed by PIM-DM and described in RFC 5973, triggering creation of an SG state upon receipt by a downstream router. However, source active messages may be generated by multicast tunneling edge devices on a multi-layer link even if state refresh messages have not been received from upstream routers. Furthermore, multicast routers on a multi-layer link may create PIM-DM multicast forwarding state in response to source active messages received from that link, as if the routers had received incoming data from the link, even if they would not have done so in response to an incoming state refresh message. As another example, the source active messages may, on multi-layer links, include and replace the functionality of assert messages employed by PIM-DM and described in RFC 5973, triggering creation of an SG state upon receipt by a downstream router on all unpruned outgoing interfaces. However, source active messages may be generated by routers on a multi-layer link even if that router does not detect incoming data on what the router believes to be an outgoing interface. Furthermore, multicast routers on a multi-layer link may create PIM-DM multicast forwarding state in response to source active messages received from that link, precisely as if the routers had received incoming data from that link, even if the routers would not have done so in response to an incoming assert message.

The source active messages may also be used to carry user traffic to be forwarded by the multicast tunneling edge device receiving the source active message. For example, instead of sending all user multicast traffic for an SG pair over the multicast tunnel specific to that group, every $n^{th}$ user packet, or one user packet every t seconds, may be sent along the common multicast tunnel to which the multicast group maps, thereby providing a more efficient mechanism for handling multicast traffic with a low traffic rate. As another example, data loss or delay while establishing a new multicast tunnel may be avoided by embedding the first few multicast messages received when a new multicast tunnel is to be established in source active messages. As still another example, user traffic sent over a control channel may itself serve as a source active message.

Besides originating source active messages on behalf of upstream sources, one or more multicast tunneling edge devices on a multi-layer link may be designated to originate source active messages on behalf of hosts attached directly to the multi-layer link that do not themselves have the ability to originate such messages. Unlike other multicast tunneling edge devices on that multi-layer link, the designated multicast tunneling edge device(s) may still place its interface onto the multi-layer network into a mode in which the multicast tunneling edge device (s) receives all multicast traffic so that the multicast tunneling edge device(s) is able to monitor for (and thus detect) multicast traffic for any group originated by any directly-connected host on that network. Other multicast tunneling edge device on the multi-layer link respond to the source active message in the same way as the routers would react to receipt of incoming multicast traffic from a directly-connected host on that network. The number of such designated multicast tunneling edge device in this case would be a small percentage to retain performance efficiency; one such designated multicast tunneling edge device, with a backup, may be used. Alternatively, all multicast traffic originating from directly-connected hosts on a multi-layer link, regardless to destination group, may map to a tunnel that included the designated multicast tunneling edge device as an endpoint.

In some embodiments, the multicast tunneling edge device may itself serve as an upper layer multicast router. In that case, the multicast tunneling edge device may maintain the multicast routing database used for decision making in method 400 in accordance with the usual procedures for the dense mode multicast routing protocol in use.

In other embodiments, the multicast tunneling edge device may serve as an intelligent multicast bridge. In that case, the multicast tunneling edge device may maintain the multicast routing database used for decision making in method 400 by monitoring the control messages of the dense mode multicast protocol flowing through the multicast tunneling edge device. To ensure that downstream multicast routers send upstream all the control messages the multicast tunneling edge device needs for this purpose, such as PIM-DM JOIN and PRUNE messages, the multicast tunneling edge device may filter out control messages not addressed to the specific downstream multicast router whose delivery to that downstream multicast router might otherwise have suppressed emission of what would otherwise have been redundant control messages. In that case, the multicast tunneling edge device may also filter out control messages originating at a downstream multicast router which the multicast tunneling edge device determines to be redundant, and not forward them to the other multicast tunneling edge devices of system 300.

Thus, in one embodiment, a method is provided for controlling multicast traffic across a multilayer the system. The multilayer system contains an upper layer network that uses a dense-mode multicast routing protocol and a tunnel across a lower layer network. The tunnel is part of a multicast-access link among two or more nodes of the upper layer network. Each multicast group is mapped to one or more multi-access tunnels distinguished by entry point(s) in the lower layer network. An upstream multicast tunneling edge device, or directly-connected source, on the upper layer multi-access link signals, to potential downstream multicast tunneling edge devices, via control messages, the presence of a multicast SG pair on the upper layer multi-access link. The downstream multicast tunneling edge devices on the upper layer multi-access link create a multicast forwarding state for the SG pair in response to the control messages. The downstream multicast tunneling edge devices adapt the multicast forwarding state in accordance with the rules of the multicast routing protocol employed on the upper layer network. Each downstream multicast tunneling edge device determines, from its multicast forwarding state for the known SG pairs, a set of multi-access tunnels across the lower layer network for which the downstream multicast tunneling edge device serves as an exit point. Each downstream multicast tunneling edge device configures the set of tunnels to deliver the associated multicast traffic to the downstream multicast tunneling edge device. The set of tunnels then deliver the multicast traffic across the lower layer network to the downstream multicast tunneling edge device.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:
1. A system for tunneling multicast traffic across a lower-layer network, the system comprising:
  at least three multicast tunneling edge devices configured to:
    exchange data with each other over the lower-layer network, and
    tunnel multicast traffic from an upper-layer network across the lower-layer network, the multicast traffic in the upper-layer network associated with a plurality of different source, group (SG) pairs disposed in the upper-layer network, wherein:
  the multicast traffic for the plurality of SG pairs is routed through the upper-layer network towards group members disposed in the upper-layer network using a dense-mode multicast routing protocol,
  each SG pair maps to at least one tunnel across the lower-layer network, each tunnel comprising at least one multicast tunneling edge device as an entry endpoint and at least two multicast tunneling edge devices as exit endpoints; and each multicast tunneling edge device is configured to enable and disable itself as an exit endpoint dependent on whether the multicast tunneling edge device is to forward multicast traffic for an active SG pair.

2. The system of claim 1, wherein at least one of the multicast tunneling edge devices learns of the active SG pair through a data or control message.

3. The system of claim 1, wherein:
the multicast traffic for the active SG pair is received across the at least one tunnel.

4. The system of claim 1, wherein the dense mode routing protocol employed by the upper-layer network includes at least one of:
Protocol-Independent Multicast Dense Mode (PIM-DM),
Distance Vector Multicast Routing Protocol (DVMRP), and
a multicast routing protocol that reactively prunes unneeded branches for distribution of multicast traffic.

5. The system of claim 1, wherein:
multicast traffic for a particular SG pair is tunneled across the lower-layer by embedding upper-layer multicast data in lower-layer multicast packets, specifying as a destination address of the lower-layer multicast packets a lower-layer group identity (ID) to which a specific SG pair maps; and
the multicast tunneling edge devices are configured to enable themselves as exit endpoints of a tunnel corresponding to the specific SG pair by joining a corresponding lower-layer group corresponding to the specific SG pair, and disable themselves as exit endpoints of the tunnel corresponding to the specific SG pair by leaving the corresponding lower-layer group.

6. The system of claim 1, wherein:
multicast traffic from the upper-layer network is encrypted for tunneling across the lower-layer network.

7. The system of claim 1, wherein:
at least one of the multicast tunneling edge devices is configured to act as a multicast router in the upper-layer network for the dense-mode multicast routing protocol.

8. The system of claim 1, wherein:
at least one of the multicast tunneling edge devices is configured to act as a multicast bridge in the upper-layer network.

9. The system of claim 1, wherein:
at least one of the multicast tunneling edge devices is configured to learn of the active SG pair through a control message.

10. The system of claim 9, wherein the control message is one of:
a single message that contains one of:
a list of different SG pairs for multicast traffic, or
a single SG pair for multicast traffic,
a group listing message listing all groups for which a particular source is originating multicast traffic, or
a source listing message listing all sources upstream of an originating router that are originating traffic for a particular group.

11. The system of claim 9, wherein at least one of:
the control message is unicast, repeated periodically, and carried by one of:
a non-reliable transport mechanism, or
a reliable transport mechanism and the control messages carry only changes in active sources.

12. The system of claim 9, wherein:
the control message is multicast and repeated periodically.

13. The system of claim 9, wherein:
the control message acts as at least one of a state refresh or assert message in a Protocol-Independent Multicast Dense Mode (PIM-DM).

14. The system of claim 9, wherein the control message is at least one of:
sent by another multicast tunneling edge device, and
sent by a router upstream of another multicast tunneling edge device.

15. A multicast tunneling edge device comprising:
a first interface configured to communicate multicast traffic associated with a plurality of different source, group (SG) pairs through tunnels across a lower-layer network;
a second interface configured to communicate multicast traffic associated with the SG pairs through an upper-layer network in which the multicast traffic is routed by a dense-mode multicast routing protocol, and
processing circuitry configured to determine whether to perform, based on a triggering event associated with an SG pair, one of:
operations related to a change in forwarding multicast traffic and transmission of Source Active messages for the SG pair received from the upper-layer network, and
operations related to establishment of lower-layer group memberships on the lower-layer network, the operations including determining whether or not to configure or retain the multicast tunneling edge device as an endpoint of a tunnel across the lower-layer network carrying multicast traffic for the SG pair dependent on whether other Source Active messages for another SG pair are being received.

16. The multicast tunneling edge device of claim 15, wherein the operations related to a change in forwarding multicast traffic and transmission of Source Active messages for the SG pair received from the upper-layer network comprise one of:
initiating forwarding of multicast traffic for the SG pair and transmission of the Source Active messages for the SG pair to potential exit multicast tunneling edge devices on the lower-layer network, the Source Active messages configured to inform each potential exit multicast tunneling edge device to configure the potential exit multicast tunneling edge device to receive multicast traffic for the SG pair to be tunneled across the lower-layer network, and
terminating forwarding of the multicast traffic for the SG pair and transmission of the Source Active messages for the SG pair to the potential exit multicast tunneling edge devices on the lower-layer network.

17. The multicast tunneling edge device of claim 15, wherein the operations related to establishment of lower-layer group memberships on the lower-layer network comprise:
determining whether the other Source Active messages are being received from another multicast tunneling edge device on the lower-layer network for the other SG pair and whether data for the other SG pair is to be forwarded out another link, and one of:
configuring the multicast tunneling edge device as an endpoint of a tunnel across the lower-layer network carrying multicast traffic for the other SG pair in response to determining that the other Source Active messages are being received from the other multicast tunneling edge device across the lower-layer network for the other SG pair and data for the other SG pair is to be forwarded out the other link onto the upper-layer network, and determining whether the multicast tunneling edge device is to remain the endpoint of the tunnel carrying multicast traffic for the other SG pair in response to determining that the other Source Active messages are no longer being received from the other multicast tunneling edge device on the multilayer link for any other SG pair mapping to the same tunnel and data for the other SG pair is no longer to be forwarded out the other link, and, in response determining not to be the endpoint of the tunnel carrying multicast traffic for the other SG pair, configuring the multicast tunneling edge device to no longer be the endpoint of the tunnel carrying multicast traffic for the other SG pair.

18. The multicast tunneling edge device of claim 15, wherein the processing circuitry is further configured to examine a routing database maintained by an upper-layer multicast routing protocol to determine at least one of:

whether to initiate or terminate forwarding of the multicast traffic for the SG pair received from the upper-layer network onto a tunnel across the lower-layer network, and whether to initiate or terminate forwarding of the multicast traffic for the SG pair received from a tunnel across the lower-layer network onto the upper-layer network.

19. The multicast tunneling edge device of claim 15, wherein the triggering event comprises at least one of:

a change in multicast routing as indicated by an upper-layer multicast routing protocol, receipt of a Source Active message across a multi-layer link, a timeout, and another event that is to effect a change in a lower-layer group membership or in generation of Source Active messages.

20. The multicast tunneling edge device of claim 15, wherein:

the Source Active messages are configured to travel along the same upper-layer path as the multicast traffic but are unaffected by lower-layer group membership restrictions.

21. The multicast tunneling edge device of claim 15, further comprising:

an upper-layer module configured to communicate with at least one of a router and group member on the upper-layer network, and a lower-layer module configured to communicate with at least one of a router and group member on the lower-layer network, wherein the upper-layer module is further configured to inform the lower-layer module that the lower-layer module is to one of join or leave a lower-layer source-specific multicast group (LowerAddr(Entry(S)),LowerGroup(S,G)) or any-source multicast group (*,LowerGroup(S,G)) to respectively form or cease functioning as an endpoint of a tunnel for the SG pair.

22. A non-transitory computer-readable storage medium that stores instructions for execution by one or more processors of a multicast tunneling edge device to configure the multicast tunneling edge device to:

receive a control message from an upstream multicast tunneling edge device, the multicast tunneling edge device and upstream multicast tunneling edge device in a lower-layer network, the control message identifying a source of multicast traffic and a group to which the multicast traffic is to be transmitted, the source and group members in an upper-layer network that employs a dense-mode multicast routing protocol to route traffic for the source and group; and in response to receiving the control message, configure the multicast tunneling edge device to serve as an exit endpoint of a tunnel across the lower-layer network through which the upstream multicast tunneling edge device is to forward the multicast traffic for the source and group further downstream to at least one group member so long as an indication from the dense-mode multicast routing protocol that the multicast tunneling edge device is to no longer forward traffic downstream to any group member for any source, group pair carried by the tunnel is not received.

23. The non-transitory computer-readable storage medium of claim 22, wherein the instructions configure the multicast tunneling edge device to act as at least one of:

a multicast router in the upper-layer network for the dense-mode multicast routing protocol, and a multicast bridge in the upper-layer network.

24. A method performed by a multicast tunneling edge device for controlling tunneling across a lower-layer network, the method comprising:

receiving, at a multicast tunneling edge device of the lower-layer network, a control message for multicast traffic, the control message indicating a source, group (SG) pair containing identification of a source in an upper-layer network originating the multicast traffic and a group to which the multicast traffic is directed in the upper-layer network;

determining, from a dense-mode multicast routing protocol employed in the upper-layer network, whether to forward multicast traffic for the SG pair further downstream towards members of the group in the upper-layer network, independent of whether the multicast tunneling edge device is to forward multicast traffic further downstream for any other SG pair;

in response to determining, by the multicast tunneling edge device, that the multicast tunneling edge device is to forward multicast traffic for the SG pair further downstream, configuring the multicast tunneling edge device as an exit point of a tunnel from another multicast tunneling edge device at which traffic for the SG pair enters the lower-layer network; and receiving multicast traffic for the SG pair from an entry multicast tunneling edge device through the tunnel, and forwarding the multicast traffic for the SG pair downstream towards members of the group.

25. The method of claim 24, further comprising:

determining, from the dense-mode multicast routing protocol employed in the upper-layer network, whether or not to forward multicast traffic further downstream towards members of a particular group for any SG group for which data is or may be received through a particular tunnel or set of tunnels across the lower-layer network; and in response to determining, by the multicast tunneling edge device, that the multicast tunneling edge device is not to forward traffic further downstream for any SG pair associated with the tunnel, configuring the multicast tunneling edge device so as to not be the exit point of the tunnel.

26. The method of claim 24, wherein:

multicast traffic for a specific SG pair is tunneled across the lower-layer network by embedding upper-layer multicast data in lower-layer multicast packets, specifying as the destination address of those lower-layer multicast packets a lower-layer group identity (ID) to which the specific SG pair maps; and the multicast tunneling edge device is configured to enable itself as an exit endpoint of a tunnel corresponding to the specific SG pair by joining a corresponding lower-layer group corresponding to the specific SG pair, and disable itself as the exit endpoint of the tunnel corresponding to the specific SG pair by leaving the corresponding lower-layer group.

\* \* \* \* \*

UNITED STATES PATENT AND TRADEMARK OFFICE
CERTIFICATE OF CORRECTION

Page 1 of 2

PATENT NO. : 9,729,430 B2
APPLICATION NO. : 14/692015
DATED : August 8, 2017
INVENTOR(S) : Joseph Jacob Weinstein It is certified that error appears in the above-identified patent and that said Letters Patent is hereby corrected as shown below:

On the Title Page

On page 2, in Column 2, item (56), under "Other Publications", Line 12, delete "Hanks." and insert --Hanks,-- therefor On page 2, in Column 2, item (56), under "Other Publications", Line 18, delete "Y," and insert --Y.-- therefor In the Specification In Column 4, Line 45, after "positioning", delete "the"

In Column 4, Line 48, delete "(USB)," and insert --(USB)),-- therefor

In Column 5, Line 42, after "Telecommunications", delete "The"

In Column 11, Line 21, delete "(LowerAddr(Entry(S),LowerGroup(S,G)))." and insert --(LowerAddr(Entry(S)),LowerGroup(S,G)).-- therefor In Column 12, Line 13-14, delete "(LowerAddr(Entry(S),LowerGroup(S,G))" and insert --(LowerAddr(Entry(S)),LowerGroup(S,G))-- therefor In Column 16, Line 7-8, delete "(LowerAddr(Entry(S'),LowerGroup(S',G'))" and insert --(LowerAddr(Entry(S')),LowerGroup(S',G'))-- therefor In Column 16, Line 10, delete "(LowerAddr(Entry(S),LowerGroup(S,G))" and insert --(LowerAddr(Entry(S)),LowerGroup(S,G))-- therefor In Column 16, Line 39, delete "(LowerAddr(Entry(S),LowerGroup(S,G))." and insert --(LowerAddr(Entry(S)),LowerGroup(S,G)).-- therefor Signed and Sealed this
Twenty-eighth Day of May, 2019

Andrei Iancu
*Director of the United States Patent and Trademark Office*

In Column 16, Line 46, delete "(LowerAddr(Entry(S),LowerGroup(S,G))." and insert --(LowerAddr(Entry(S)),LowerGroup(S,G)).-- therefor In Column 18, Line 41, delete "device (s)" and insert --device(s)-- therefor